Nov. 5, 1940.   P. N. CLOUTIER   2,220,216
JOINT FOR ARTICULATED ARMS
Filed June 8, 1939

INVENTOR.
Paul N. Cloutier.
BY Harry Lea Dodson.
ATTORNEY.

Patented Nov. 5, 1940

2,220,216

UNITED STATES PATENT OFFICE 2,220,216

JOINT FOR ARTICULATED ARMS

Paul N. Cloutier, Decatur, Ill., assignor to Faries Manufacturing Company, Decatur, Ill., a corporation of Illinois Application June 8, 1939, Serial No. 278,002

7 Claims. (Cl. 285—96.7)

My invention relates to that class of joints employed preferably in articulated arms used for dental brackets, although it will be clearly apparent from the hereinafter contained description that it is useful in many other locations.

Devices of this class with which I am familiar, are subject to a very serious objection, in that no provision is made to take up the wear resulting from the constant rubbing against each other of the two parts of the joint while in use. This friction results shortly in producing considerable looseness or play in the assembled fitting, which prevents the maintenance of the arm joint in a well fitted and smooth acting condition.

My invention has for its principal object to provide a construction which will entirely and permanently overcome this difficulty by providing a simple means of adjusting the joint to take up the wear.

A further object of my invention is to provide a construction in which the ends of the arm sections will abut the inner rotary cylindrical sleeves thus providing means to rotate these sleeves.

A further object of my invention is to provide a construction which will insure a maximum of space for the electric wire conductors which are usually mounted in these joints when the articulated arms are used as a dental bracket and to avoid any sharp edges which might chafe the insulation on the wires making possible a short.

A further object is to provide a detent or stop which will prevent the sections being rotated a full circle or 180° so that the wires cannot be twisted off in this manner.

My means of accomplishing the foregoing objects may be more fully comprehended by having reference to the accompanying drawing, which is hereunto annexed and is a part of this specification in which.

Figure 1:
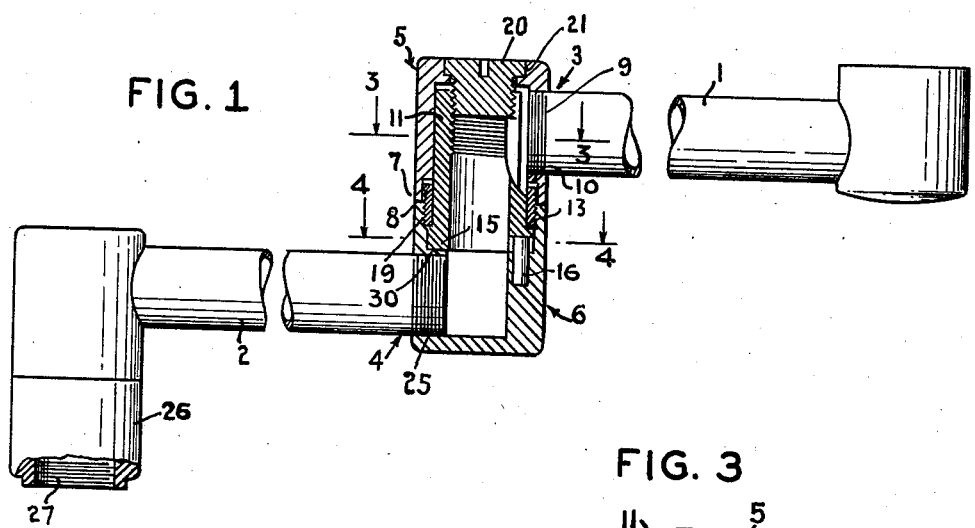
Fig. 1 is a side elevational view of my device with parts broken away and shown in section for clarity.
Figure 2:
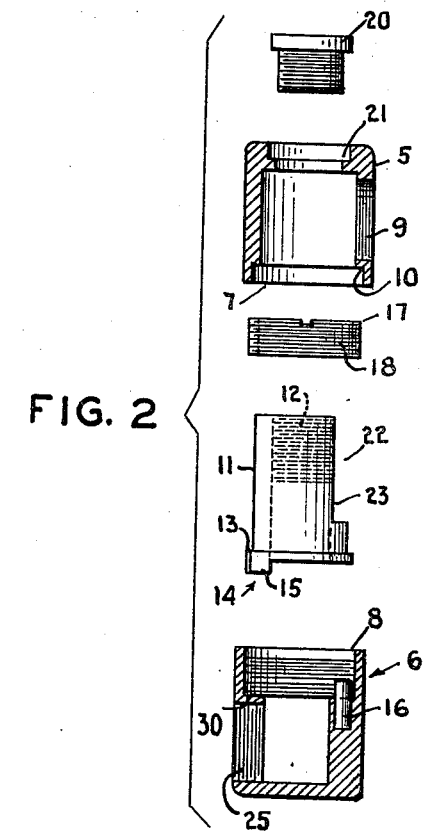
Fig. 2 is an exploded view in elevation of my device, certain parts being shown in full elevation and other parts being shown in section.
Figure 3:
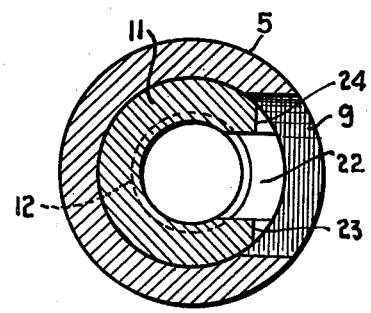
Fig. 3 is a cross sectional view showing the electric wire outlet taken on line 3—3 of Fig. 1 and looking in the direction of the arrows.
Figure 4:
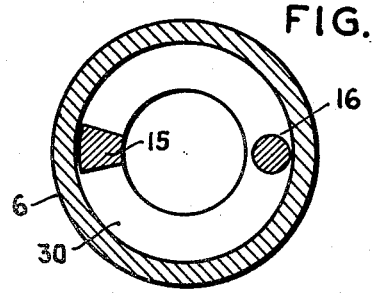
Fig. 4 is a cross sectional view showing the detent and stop taken on line 4—4 of Fig. 1 and looking in the direction of the arrows. Similar reference numerals refer to similar parts throughout the entire specification.

As shown in the drawing, the articulated arm, as illustrated, comprises a pair of sections 1 and 2, though obviously any desired number of sections may be employed. The arm is adapted for rotary adjustment and is designed to be mounted upon a vertical standard (not shown).

These sections 1 and 2 are connected at their ends 3 and 4 by my improved joint. This joint consists of a pair of cup-shaped members 5 and 6 having their open ends 7 and 8 abutting. The cup-shaped member 5 has a threaded opening 9 in its side in which is screwed the end 3 of the section 1. After this is done the parts are preferably soldered together. The cup-shaped member 5 has a shoulder 10 formed on its inner wall adjacent the open end 7 thereof, the object of which will be hereinafter explained.

A rotary sleeve 11 which is provided with internal threads 12 is mounted inside the cup-shaped member 5. This sleeve 11 is provided with a circumferential shoulder 13 adjacent its end 14. This end 14 extends into the other cup-shaped member 6 and is provided with a detent or stop 15 which abuts the shoulder 30 formed on the inner wall of the cup-shaped member 6. This detent 15 engages a pin or stop 16 mounted on the shoulder 10 and this prevents the arm sections turning through 180° and in that manner twisting off the wire conductors.

The cup-shaped member 6 and the sleeve 11 are held together by means of an annular member 17 which is slidably and rotatably mounted on the sleeve 11 and abuts the circumferential shoulder 13. External threads 18 are cut or formed on the annular member 17 which are fitted to internal threads 19 cut on the inner wall of the cup-shaped member 6. After member 17 has been screwed into position, it holds the sleeve 11 securely against axial movement though leaving the members free to rotate with relation to each other. I have found in practice that it is desirable to solder this annular member 17 in place, thus insuring the joint against coming apart.

A cap screw 20 is placed in a central opening 21 formed in the closed end of the cup-shaped member 5 and is then screwed into the internal threads 12 in the rotary sleeve 11 drawing the parts into a snug and secure joint.

In this position, the proper adjustment of the parts having been made, the end of the detent 15 will abut the shoulder 10 and slide upon it, as the parts are rotated, until it contacts the pin or stop 16 on the shoulder and further rotation of the sections in that direction is impossible. A segment is milled off of the sleeve 11 forming a slot 22 through which the electric wires pass.

The outer face of both sides of the slot 22 are milled flat, and these flat walls 23 and 24 are located at each side of the opening 9 in the wall of the cup-shaped member 5 and are abutted by the end 3 of the section 1, thus providing means to rotate the sleeve 11 within the cup-shaped members.

End 4 of section 2 is screwed into threaded opening 25 in the side of cup-shaped member 6 and isasmuch as the cup-shaped member 26 on the opposite end of section 2 is identical to the one described, except that it has a threaded opening 27 at its bottom to receive the vertical standard, a detailed description of the joint at this end of the arm 2 is deemed to be unnecessary.

When the parts become worn, all that is required to compensate for such wear is to tighten the cap screw 20 and the parts will be again drawn snugly together. It will be apparent to those skilled in the art that this can be done without the necessity of disassembling the joint. It will also be clear that by milling off the segment on the sleeve 11 that I form ample room for the wires to be drawn through without endangering the insulation at all.

Having described my invention, what I regard as new and desire to secure by Letters Patent is:

1. A joint for an articulated arm comprising a pair of cup shaped members, one of said members having internal threads adjacent its open end, an externally threaded annular member mounted in said threads, a rotatable sleeve fitted in said annular member, a shoulder at one end of said sleeve adapted to abut said annular member, the upper cup shaped member having an internal groove adjacent one end adapted to enclose said annular member but spaced therefrom, means mounted in the upper cup shaped member to engage said sleeve to prevent axial movement of the two cup shaped members.

2. A pair of cup shaped members, a shouldered sleeve, means detachably mounted in one of said members which engage said shoulder, detachable means mounted in one end of the upper cup shaped member adapted to engage said sleeve whereby the wear caused by the friction of said members engaging each other can be taken up.

3. A pair of cup shaped members, an annular member detachably mounted in the lower cup shaped member adjacent its open end, a sleeve in the upper cup shaped member, the lower end of which extends through said annular member partially into the lower cup shaped member, an external shoulder on said sleeve which abuts the cup of said annular member, the upper cup shaped member having means mounted in its head which engages said sleeve and holds said cup shaped members against longitudinal movement but permits the two members to rotate with relation to each other.

4. A pair of cup shaped members, rotatable means mounted therein whereby said members are free to rotate with relation to each other, means detachably mounted in the head of the upper cup shaped member which engages said rotatable means and holds said cup shaped members against axial movement.

5. A joint for an articulated arm, comprising a cup-shaped member, having a central opening in its closed end and a threaded side opening, an annular shoulder on its inner wall adjacent its open end, an internally threaded sleeve rotatably mounted in said cup-shaped member, a circumferential shoulder on said sleeve, a detent projecting axially from said shoulder, a screw fitted to the central opening in said sleeve which engages said threads, whereby the wear may be taken up, a segment of said sleeve being milled away, the flattened wall abutting the end of said section when the cup-shaped member is screwed on it, a second cup-shaped member having internal threads and a threaded opening in one side, an annular shoulder on its inner wall, a pin on said shoulder adapted to engage said detent, an annular member screwed into the threads in said second cup-shaped member, said sleeve being slidably and rotatably mounted therein, external threads on said annular member which fit the threads in the second cup-shaped member, and means to hold said annular member fixedly in place.

6. A pair of cup shaped members, means detachably secured in the lower cup shaped member, said means extending into the upper cup shaped member but being spaced therefrom, a sleeve provided with a shoulder at one end adapted to engage said detachable means, detachable means mounted in the head of the upper cup shaped member which engages said sleeve.

7. A joint for an articulated arm, comprising a cup-shaped member, having a central opening in its closed end and a threaded side opening, an annular shoulder on its inner wall adjacent its open end, an internally threaded sleeve rotatably mounted in said cup-shaped member, a circumferential shoulder on said sleeve, means to prevent the rotation of said members 180°, means to take up the wear of said cup-shaped members, means to hold said sleeve stationary, a second cup-shaped member having internal threads and a threaded opening in one side, an annular shoulder on its inner wall, an annular member screwed into the threads in said second cup-shaped member, said sleeve being slidably and rotatably mounted therein, external threads on said annular member which fit the threads in the second cup-shaped member, and means to hold said annular member fixedly in place.

PAUL N. CLOUTIER.